:::page-header
United States Patent Office
3,337,981
Patented Aug. 29, 1967
:::

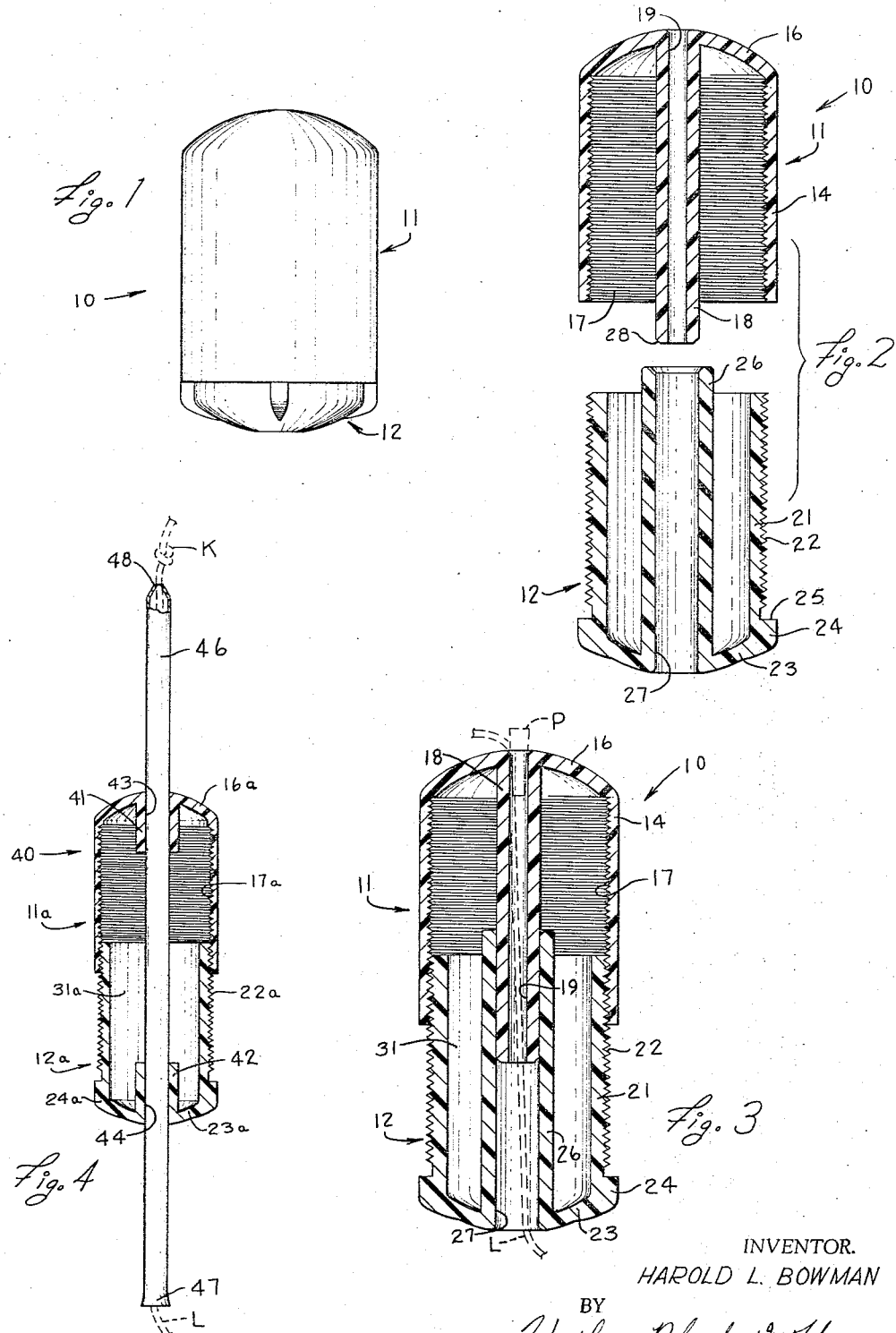

3,337,981
FISHING FLOAT
Harold L. Bowman, 28 Ashland,
Battle Creek, Mich. 49017
Filed Dec. 14, 1964, Ser. No. 418,222
4 Claims. (Cl. 43—43.14)

This invention relates to a fishing float and, more particularly, relates to a fishing float the buoyancy of which may be regulated by the user.

Previous fishing floats of the type whose buoyancy is varied by varying the external volume, and more specifically, the length thereof, present several problems. It was noted, for example, that previous floats constructed as a pair of telescoping parts are often difficult to assemble, particularly where the parts are of substantial diameter and are closely interfitted. A high level of precision in positioning the ends of such parts concentrically with respect to each other and in positioning the walls thereof in parallelism is required as the interior part is inserted into the exterior part. Moreover, such previous floats tend to be relatively weak unless the parts are telescoped over a substantial length thereof. Such prior floats have not been readily returnable to a particular condition of buoyancy with precision particularly under disadvantageous environmental conditions such as darkness and without the use of external gauges or the like.

Thus, the objects of this invention include:

(1) To provide a fishing float, the buoyancy of which varies with the volume of an interior air chamber, the chamber volume being adjusted by changing the exterior volume or, more precisely, the over-all length of the float.

(2) To provide a device, as aforesaid, which comprises a pair of shells which telescope in a close and water-tight manner and in which means are provided for guiding the shells into a telescoped condition to ease assembly thereof by assuring concentricity of the adjacent shell ends and parallelism of the shell axes prior to and during telescoping thereof.

(3) To provide a device, as aforesaid, the buoyancy of which may be varied over a wide range without leakage and which tends to remain water tight and rigid even when the shells are telescoped to minimum extent despite prolonged exposure to water, mechanical shocks while in or out of the water and other disadvantageous environmental conditions.

(4) To provide a device, as aforesaid, in which the fishing line substantially coaxially passes through the center of the float not around the periphery of the float to minimize snagging of the line in the region of the float on foreign objects.

(5) To provide a device, as aforesaid, in which the length of the float and, hence, the buoyancy thereof, may be readily and with great precision returned to a prior value or adjusted to any desired new value without the necessity for visually inspecting the float and without the use of external gauges or tools.

(6) To provide a device, as aforesaid, which is of simplified construction, which comprises in its simplest form a pair of monolithic telescoping members, which can be made of relatively inexpensive materials at low cost, which is particularly adapted to mass production in large numbers at low unit cost and which will be capable of a long and trouble-free service life even under adverse conditions.

Other objects and purposes of this invention will be apparent to persons acquainted with apparatus of this general type upon reading the following specification and inspecting the accompanying drawings.

In the drawings:

FIGURE 1 is a side elevational view of a preferred embodiment of the invention in its contracted position.

FIGURE 2 is an exploded central cross-sectional view of the fishing float of FIGURE 1.

FIGURE 3 is a central cross-sectional view of the fishing float of FIGURE 1 in a condition of intermediate length and indicating, in broken lines, a fishing line and jamming plug for fixing same to said float.

FIGURE 4 is a central cross-sectional view of a modified fishing float embodying the invention.

Certain terminology will be used in the following description for convenience in reference only and will not be limiting. The words "upwardly" and "downwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

*Description*

The fishing float 10 (FIGURES 1 and 2) embodying the invention comprises an external shell 11 and an internal shell 12.

The external shell 11 has a circular, substantially cylindrical peripheral wall 14 which is closed at its upper end by a preferably integral, outwardly convex end wall 16. The peripheral wall 14 is internally threaded as indicated at 17 from the lower end thereof to a point preferably closely adjacent the upper end wall 16. A circular, cylindrical guide conduit 18 is preferably coaxially arranged within the shell 11 and extends from a preferably integral connection with the upper end wall 16 downwardly past the lower end of the peripheral wall 14. A central opening 19 extends throughout the length of guide conduit 18 and opens upwardly through the center of the upper end wall 16.

The internal shell 12 comprises a circular and substantially cylindrical peripheral wall 21 which is externally threaded, here with raised threads 22, downwardly from the upper end thereof. The threaded portions 17 and 22 correspond in diameter and are engageable whereby the lower shell 12 may be snugly threaded coaxially into and along the external shell 11 as indicated in FIGURE 3. The lower end of the peripheral wall 21 is terminated by a preferably outwardly convex lower end wall 23 which is preferably integral with the peripheral wall 21.

A plurality, here four, of preferably evenly circumferentially spaced ears 24 extend radially from the peripheral wall 21 at the bottom thereof and are preferably faired into the lower end wall 23. The ears 24 provide finger grips to facilitate threading of the shell 12 into and out of the shell 11. The upper ends 25 of the ears 24 define, in the present embodiment, radial surfaces adapted to contact the lower edge of the peripheral wall 14 of the outer shell and establish the extent to which the inner shell 12 can be insered into the outer shell 11.

A circular, cylindrical guide conduit 26 is preferably integral with the lower end wall 23 and extends upwardly therefrom within and in coaxial alignment with the peripheral wall 21 to a point preferably spaced above the upper end of the peripheral wall 21. A central opening 27 extends the length of the guide conduit 26 and opens through the lower end wall 23.

The guide conduit 26 is preferably larger in diameter than the guide conduit 18 of the upper shell 11. More specifically, the diameter of the central opening 27 of the guide conduit 26 is preferably only slightly larger than the outside diameter of the guide conduit 18 so as to provide a water-tight sliding fit therebetween when the guide conduit 26 is telescoped over the guide conduit 18. In the particular embodiment shown, the length of the guide conduit 26 which extends upwardly beyond the upper edge of the peripheral wall 21 is limited so that the internal shell 12 may be threaded into the external shell 11 to the full extent of the threads 17 without interference between the upper end of the guide conduit 26 and the inner surface of the upper end wall 16. The guide conduit 18 preferably does not extend downwardly beyond the bottom end wall 23 of the internal shell 12 when the float 10 is adjusted to its minimum length as in FIGURE 1. When the float 10 is assembled as in FIGURE 3, the peripheral walls 14 and 21, the end walls 16 and 23 and the peripheries of the guide conduits 18 and 26 define an annular chamber 31 therewithin.

The shells 11 and 12 may be advantageously constructed of plastic such as by injection molding. The material used in the shells 11 and 12 preferably has a relatively low coefficient of friction so as to allow smooth telescoping of the shells while maintaining the clearance therebetween as sufficiently tight as to preclude entry of water under the float 10.

Operation

To assemble the float 10, the open ends of the shells 11 and 12 are placed adjacent each other with said shells substantially coaxially aligned. Thereafter, shells 11 and 12 are moved toward each other. Engagement between the shells begins with the insertion of the lower end of the guide conduit 18 into the upper end of the guide conduit 26. Such insertion will be facilitated if the outer and inner edges of the conduits 18 and 26, respectively, are chamfered as indicated, for example, at 28 (FIGURE 2). Continued telescoping of the guide conduit 26 over the guide conduit 18 brings the ends of peripheral walls of the shells 11 and 12 together and forces the conduits 18 and 26 into coaxial alignment with each other, thereby forcing coaxial alignment of the peripheral walls of the shells 11 and 12 as the ends thereof move into contact. With cocking between the shells thus prevented, moderate axial compression on the float 10 and rotation of the shells 11 and 12 with respect to each other in the proper direction will readily engage the threads 17 and 22 and start the threaded insertion of the shell 12 into the shell 11. The threading of the shell 12 into the shell 11 may be continued until the desired length of the float 10 and, hence, buoyancy thereof is achieved.

The extension of the threads 17 substantially to the end wall 16 and the limitation on the length of the guide conduit 26 to prevent interference thereof with the end wall 16 allows the length of the fully telescoped float 10 to be minimized, here closely approaching the average length of the shells 11 and 12. On the other hand, since the average length of the guide conduits 18 and 26 is substantially greater than the average length of the peripheral walls 14 and 21 including the end walls 16 and 23, a substantial length of the conduits 18 and 26 will be in telescoped engagement even as the peripheral walls 14 and 21 approach disengagement. As a result of the guide conduits' reinforcement of the float 10, said float remains water-tight in the presence of external mechanical shocks with fewer of the threads 17 and 22 engaged thereby allowing adjustment of the float to a greater length. Thus, the ratio between the useable open and closed lengths and, hence, the range of buoyancies of the float 10 is maximized.

It will be apparent that the buoyancy of the float 10 will be a function of the number of revolutions through which the shell 12 is turned as it is threaded into the shell 11. Thus, by counting such number of revolutions, the user can adjust buoyancy of the float 10 to predetermined value and can precisely return the float to any desired condition to a particular state of buoyancy after adjustment away therefrom simply by counting the number of revolutions.

Should air be trapped and pressurized in the annular chamber 31 during assembly of the float 10, this in no way degrades the water tightness of the float. Rather, such pressure tends directly to assist in preventing entrance of water into the float and also tends to urge the shells 11 and 12 axially away from each other to positively axially load and hence more tightly seal the threads 17 and 22.

To use the float 10, a fishing line indicated in broken lines at L (FIGURE 3) may be passed through the coaxial central openings 19 and 27 in the guide conduits 18 and 26. After the desired amount of line L has been pulled therethrough, any convenient means may be used to fix the line L with respect to the float 10, such means, in the particular embodiment shown, comprising a plug, indicated in broken lines at P in FIGURE 3, which is inserted in the free end of one of the central openings 19 and 27 tightly jamming the adjacent portion of line L against the wall of said central opening for frictionally holding same. The plug P is preferably disposed in the smaller diameter central opening 19 since, if placed in the opening 27, said plug P might be inadvertently expelled by the end of the guide conduit 18 during contraction of the float 10.

It is generally desirable that the baited end of the line emerge from the end of the float opposite the plug P. Thus, due to the weight of the baited end, the float 10 would tend to float with the shell 11 uppermost as it is shown in the drawings. The enlarged cross-sectional area of the air chamber 31 above the shell 12 due to the relatively large diameter of the peripheral wall 14 and the relatively small diameter of the guide conduit 18 causes the shell 11 end of the float 10 to be less dense than the shell 12 end. Hence, the float 10 will of itself tend to float with the shell 11 end thereof uppermost, a desirable characteristic since it is reinforced rather than opposed by the influence of the baited line L, thereby eliminating any tendency for spurious and misleading float gyrations which might otherwise occur.

Modification

FIGURE 4 discloses a modified float 40 which departs from the preferred embodiment 10 in several areas but which will attain at least some of the broader advantages of the invention. Parts of the float 40 corresponding to parts of the float 10 hereinabove described will be referred to by the same reference numerals thereas with the suffix "a" added thereto. The float 40 differs from the preferred float 10 in that the guide conduits 18 and 27 of the float 10 are replaced by cylindrical guides 41 and 42 which extend coaxially inwardly from the respective end walls 16a and 23a to points within the shells 11a and 12a spaced from the open axial ends thereof. The cylindrical guides 41 and 42 have preferably substantially equal diameter central openings 43 and 44, respectively, extending therethrough and opening through the central portions of the walls 16a and 23a, respectively. A hollow and substantially circular, cylindrical guide tube 46 extends coaxially and snugly through the central openings 43 and 44. The tube 46 is preferably fixed within the central opening 43 by any convenient means such as a suitable adhesive or the like. The guide 42, on the other hand, is slideably disposed with respect to the tube 46. The fit of the tube within the central openings 43 and 44 is, in any event, sufficiently snug as to preclude entry of water into the annular chamber 31a within the float 40. The lower end of the tube 46 is preferably belled as indicated at 47 to prevent the shell 12a from sliding downwardly off therefrom. The upper end of the tube 46 is preferably necked down as indicated at 48. The tube 46 may be of any desired rigid material, such as metal or a suitable plastic.

A fishing line L may be inserted into the tube 46 from either end thereof. In the particular embodiment shown, the float 40 is adapted for use as a slip-type float in which use the tube 46 closely surrounds but is readily slideable along the line L between a knot K therein and the baited lower end thereof. However, it will be recognized that the invention is not limited to the above-described arrangement for maintaining the tube 46 on the line L.

Should for some reason the shells 11a and 12a become disengaged, same may be readily threaded together. The guide tube 46 is firmly maintained coaxial with the shell 11a by the guide 41 and cooperates with the guide 42 to firmly maintain the shells 11a and 12a coaxial even when said shells are disengaged from each other, thus facilitating proper re-engagement of the threads 17a and 22a.

Although particular preferred embodiments of the invention have been disclosed above for illustrative purposes, it will be noted that variations or modifications thereof which lie within the scope of the appended claims are fully contemplated.

The embodiments of the invention in which an exclusive property or privilege is claimed are defined as follows:

1. In a fishing float, the combination comprising:
a pair of telescoped circular cylindrical shells in threaded engagement and movable axially along each other for substantially the length of each shell, for varying the over-all volume of the float, each of said shells having an integral end wall at the outer axial end thereof;
a cylindrical guide conduit integral with the end wall of each of said shells and extending therefrom coaxially along said shell beyond the inner end thereof, said cylindrical guide conduits having central openings therethrough allowing snug but sliding insertion of one of said cylindrical guide conduits into the central opening of the other of said cylindrical guide conduits for substantially the length thereof;
whereby the telescoped condition of said cylindrical guide conduits reinforces said float when said shells approach disengagement and, hence, maximum float volume.

2. The device defined in claim 1 in which the radially outer one of said shells is integral with said one of said cylindrical guide conduits so that said outer one of said shells defines the less dense end of the float.

3. In a fishing float, the combination comprising:
a pair of telescoped circular cylindrical shells in threaded engagement and movable axially along each other for substantially the length of each shell for varying the over-all volume of the float, each of said shells having an integral end wall at the outer axial end thereof;
a cylindrical guide integral with the end wall of each of said shells and extending therefrom coaxially part way along said shell, said cylindrical guides having central openings therethrough of substantially similar size which extend outwardly through said end walls;
an elongated guide tube received in said central openings and extending coaxially through and beyond said shells, said guide tube being fixed with respect to one of said cylindrical guides and axially slideable along the other of said cylindrical guides;
whereby the telescoped condition of said cylindrical guides and guide tube reinforces said float when said shells approach disengagement and, hence, maximum float volume.

4. In a fishing float, the combination comprising:
a pair of telescoped shells threadedly engaged with each other and movable axially along each other for substantially the length of each shell, each of said shells having an end wall at the outer axial end thereof;
cylindrical guide means defining a central opening through each of said end walls and being axially telescoped and movable with respect to each other for substantially the length thereof, at least one of said cylindrical guide means extending axially inwardly beyond the inner end of the shell associated therewith a distance sufficient to engage the other of said cylindrical guide means prior to telescoped engagement of said shells;
whereby telescoped engagement of said cylindrical guide means pilots telescoped engagement of said shells during assembly of said float; and
whereby axial movement and adjustment of said shells is accomplished by rotation of one of said shells with respect to the other of said shells.

References Cited

UNITED STATES PATENTS

| 2,519,427 | 8/1950 | Besmer | 43—43.14 |
| 2,693,049 | 11/1954 | Atton | 43—44.9 |
| 2,777,238 | 1/1957 | Taylor et al. | 43—44.9 X |
| 2,803,917 | 8/1957 | Kimbrough | 43—44.91 X |

SAMUEL KOREN, *Primary Examiner.*

W. H. CAMP, *Assistant Examiner.*